United States Patent Office 3,544,298
Patented Dec. 1, 1970

3,544,298
**LOW MAGNESIUM AMMONIUM POLY-
PHOSPHATE SOLUTIONS**
Charles B. R. Fitz-William, Jr., Richmond, and James E. Sansing, Jr., Chester, Va., assignors to Allied Chemical Corporation, New York, N.Y., a corporation of New York
No Drawing. Filed Sept. 22, 1967, Ser. No. 669,724
Int. Cl. C05b 7/00
U.S. Cl. 71—34
2 Claims

ABSTRACT OF THE DISCLOSURE

An ammonium polyphosphate fertilizer solution having a relatively low amount of magnesium which is prepared by mixing aqueous ammonia with superphosphoric acid in a reaction zone to give an $N/P_2O_5$ ratio within the range of 0.37–0.45. During the mixing, the temperature of the reaction mixture is maintained at least above 70° C. The mixture is then cooled to 45–65° C. and maintained in that temperature range until at least 5% solids have precipitated. The precipitated solids are separated and the $N/P_2O_5$ ratio of the reaction solution is adjusted to within the range of 0.27–0.35 by vaporization of ammonia and/or addition of phosphoric acid.

BACKGROUND OF THE INVENTION

"Wet-process" phosphoric acid of commerce is manufactured by a process which, in essence, consists of treating phosphate rock (essentially calcium phosphate) with sulfuric acid, whereby there is formed free phosphoric acid and calcium sulfate. The latter, being insoluble, is separated from the acid by filtration. While this process is simple in concept, it is fraught with many technical difficulties and complications, and the resultant phosphoric acid is a highly impure material, containing relatively large amounts of dissolved sulfates and smaller amounts of fluorides, fluosilicates and other salts of aluminum, magnesium, iron and other metals, as well as suspended organic matter. These impurities precipitate and settle out as solids or sludge at a slow rate occurring over an interval of several days and even weeks. The amount of total solids which settle out varies, generally from 0.5 to 10 percent by weight of acid and their composition varies during aging of the acid.

So-called superphosphoric acid containing at least 66% $\cdot P_2O_5$ content may be economically prepared by evaporating water from wet-process phosphoric acid. The term superphosphoric acid as used in this application is defined as phosphoric acid containing substantial quantities of both ortho- and polyphosphoric acids. These polyphosphoric acids include pyrophosphoric acid and other linear polymers.

Ammonium polyphosphate solutions made from wet process phosphoric acid normally contain as metal impurities iron, aluminum and magnesium. Of these, magnesium occurs in smallest concentration but has the most deleterious effect on the stability of the ammonium polyphosphate solutions. Commercial ammonium polyphosphate solutions for fertilizer use normally are made with 45–65% of their $P_2O_5$ content as polyphosphate. It has been found that such solutions containing a $Mg/P_2O_5$ ratio of 0.0056 stored at ambient temperatures, will precipitate solids containing magnesium in about 4 months. It has further been found that such solutions containing a $Mg/P_2O_5$ ratio of 0.002 or less will not precipitate solids containing magnesium for 6–12 months or longer.

It is known that iron and aluminum ions present as the predominant impurities in wet process phosphoric acid, form gelatinous precipitates which render ammonium salt solutions prepared therefrom thixotropic and gelatinous. Other metal ions incident as impurities in wet process phosphoric acid such as copper, chromium, magnesium, zinc ions, etc., form granular precipitates in ammoniacal solutions. U.S. Pat. 3,044,851 discloses that the formation of gelatinous iron and aluminum precipitates can be prevented by heating the acid to expell the volatile impurities and thereafter forming acyclic polyphosphoric acid in the acid. The other metal impurities in the acid can be allowed to precipitate and be separated therefrom by a simple settling, centrifuging, or filtering step; preferably, however, the precipitation of these metals is also prevented by forming in the acid an additional quantity of the acyclic polyphosphoric acid.

U.S. Pat. 3,044,851 discloses that magnesium requires a far higher concentration of acid to prevent precipitation than the same amount of other metal impurities. On a molal basis, an atomic weight of magnesium requires six times as many atomic weights of phosphorus as polyphosphoric acid than an atomic weight of iron or aluminum. The selective removal of one atomic weight of magnesium would, therefore, reduce the necesary content of acylic polyphosphoric acid sixfold the reduction obtained by the removal of one atomic weight of iron or aluminum. The selected removal of magnesium can be accomplished in any suitable manner, for instance by ion exchange or by electrodeposition of the magnesium. To impart selectivity of the latter method for magnesium, a suitable membrane which is permeable only to magnesium ions can be placed about the cathode cell.

U.S. Pat. 3,044,851 further discloses that magnesium can be selectively removed from the dilute wet process acid by passing the acid over a cation exchange resin at suitable conditions, e.g., atmospheric pressure and ambient temperature.

It is one object of the present invention to establish a simple and economical process for producing an ammonium polyphosphate solution with a low magnesium content.

It is another object of the present invention to produce an ammonium polyphosphate solution with a low magnesium content.

It is an additional object of the present invention to lower the magnesium content of an ammonium polyphosphate solution to within the desired required limits.

SUMMARY OF THE INVENTION

In accordance with the present invention, aqueous ammonia and superphosphoric acid are mixed in a reaction zone to give a $N/P_2O_5$ ratio varying from 0.37–0.45. The reaction mixture is then cooled to 45–65° C. and maintained at that temperature until at least 5% solids are precipitated. The solids are separated from the reaction solution and the $N/P_2O_5$ ratio is adjusted to within the range of 0.27–0.35. Water is then added to give an ammonium polyphosphate fertilizer solution having a relatively small amount of magnesium thereby permitting long term stability of the solution.

PREFERRED EMBODIMENT OF THE INVENTION

Superphosphoric acid containing generally 66–76% $P_2O_5$ and preferably 68–73% $P_2O_5$ is mixed in a reaction zone with aqueous ammonia containing generally 24–40% ammonia and preferably 30–40% ammonia to result in a solution having a $N/P_2O_5$ ratio varying from 0.37–0.45 and preferably from 0.39–0.42. Preferably there is vigorous agitation during the mixing of the reactants. Furthermore, the proportions of the aqueous ammonia and polyphosphoric acid mixed is such that the pH of the reaction solution is within the range of 8.0–9.0 and preferably within the range of 8.5–8.8.

It should be noted at this point that the present process can also be used with a solution of ammonium polyphosphate having a $Mg/P_2O_5$ ratio above 0.002 as one of the starting materials. A normal ammonium polyphosphate solution has a $Mg/P_2O_5$ ratio of about 0.005 to 0.009. Ammonia or aqueous ammonia is added to the solution so as to bring the $N/P_2O_5$ ratio and the pH within the desired ranges.

It should be noted that generally the reaction mixture of superphosphoric acid and aqueous ammonia must have a water content of at least 20% and preferably of at least 35% based on the weight solution. The water content is kept at this level so as to prevent a large amount of diammonium phosphate from precipitating from the solution during the reaction and the precipitation periods.

During the mixing of the reactants the reaction solution is maintained generally at above 70° C. and preferably at between 85–100°C. It is believed that at this temperature fine crystals of magnesium ammonia pyrophosphate are formed which precipitate slowly. In order to precipitate the crystals of magnesium ammonium pyrophosphate more quickly, without precipitating too large an amount of diammonium phosphate, the solution is cooled to generally 45–65° C. and preferably 55–65° C. The solution is maintained at that temperature until generally at least 5% solids by weight of the solution and preferably 25% solids are precipitated. A minimum of 5% solids must be removed to reduce the magnesium to the desired level. In general no more than 25% solids are removed as larger amounts of solids are not effective in additional magnesium removed. All percentages given in this specification are by weight unless otherwise specified.

The precipitated solids include diammonium phosphate, magnesium ammonium pyrophosphate and other metal phosphates. The precipitated solids are then separated from the solution by any of several methods and preferably by filtration, since little of the reaction solution is lost in filtration.

In order to obtain the precipitation of at least 5% solids, it is necessary to allow the mixture to stand generally for at least 6 hours and preferably for at least 12 hours.

After the precipitate is separated from the reaction solution, phosphoric acid, e.g. superphosphoric acid of the same concentration as above, may be added to the reaction solution to adjust the $N/P_2O_5$ level to generally 0.27–0.35 and preferably to 0.28–0.32. Alternatively, the precipitate is separated from the reaction solution and part or all of the excess ammonia is vaporized, as by heating the solution, after which phosphoric acid is added to the solution as required to adjust the $N/P_2O_5$ level to 0.27–0.35, preferably 0.28–0.32.

The pH of the final solution should be generally in the range of 5.7–6.4 and freferably 5.9–6.2. Water is then added to the solution and it is cooled to room temperature. Generally the final ammonium polyphosphate solution will contain less than 0.20% MgO and preferably less than 0.10% MgO with a ratio of $Mg/P_2O_5$ less than 0.002. Such a solution will not precipitate solids containing magnesium within 6–12 months or longer.

The examples given below are an illustration of the invention and it is not intended to limit the invention in any way. All parts and percents are by weight.

EXAMPLE I

Superphosphoric acid having a content of about 72% $P_2O_5$ and about 0.6% MgO was simultaneously mixed with about 33% aqueous ammonia at 85–95° C. to give a solution having a $N/P_2O_5$ ratio of 0.41. The solution had a water content of about 35% and a pH of about 8.5. The temperature in the reactor was controlled at 85–95° C. by recycling a stream cooled to 55–65° C. The entire solution was then cooled to 55–65° C. and allowed to stand for 16 hours to allow the crystallization of magnesium-rich ammonium phosphate solids. A part of the cooled slurry was used as recycle to control the temperature in the reactor zone. Recycle rate for cooling was about 5 parts to one part forward flow. Slurry from the crystallizer tank was fed to pressure filters for solids separation. The slurry contained about 15% solids and a filtration rate of 0.5 gallon per minute per square foot of filter area at 50 p.s.i.g. was obtained. Superphosphoric acid, the same as that initially added to the aqueous ammonia, was added to the filtrate to adjust the pH to about 6.0 and the $N/P_2O_5$ ratio to about 0.29. Water was added such that a 10–34–0 ammonium polyphosphate solution resulted with 0.09% MgO and a $Mg/P_2O_5$ ratio of 0.0016. Such a solution will not precipitate solids containing magnesium for at least six months.

EXAMPLE II

About 455 parts of superphosphoric acid containing about 69% $P_2O_5$ and about 1% MgO was mixed with about 545 parts of aqueous ammonia containing about 158 parts of ammonia and 387 parts of water. The temperature in the reactor was controlled at 85–95° C. by recycling a stream cooled to about 60° C. The resulting solution analyzed about 13% N and about 32% $P_2O_5$ and had a pH of 8.6 and a specific gravity of 1.42, measured at 60° C. The reaction mixture was cooled to 60° C. and stored for 12 hours at 60° C. to precipitate magnesium-rich solids. Then 100 parts water and 160 parts superphosphoric acid, the same as that initially added to the aqueous ammonia, was added. The resulting slurry, containing about 10% solids, was cooled to about 35° C. and centrifuged to give a filtrate having a pH of 5.9 and containing about 10% N, 34% $P_2O_5$ and 0.2% MgO. Such a solution will not precipitate solds for at least 6 months.

This example demonstrates that final adjustment of the $N/P_2O_5$ ratio may be carried out by addition of acid prior to separation of precipitated solids, if desired.

EXAMPLE III

Superphosphoric acid containing about 72% $P_2O_5$ and 0.65% MgO was continuously mixed with 26% aqueous ammonia. Feed rates to the reactor were 100 parts per minute of the superphosphoric acid and 118 parts per minute aqueous ammonia. The temperature in the reactor was maintained at 90° C. by use of a recycle stream cooled to 55° C. A total of 25,000 parts of mixture was thus prepared, cooled to 55° C., and held at about 55° for 18 hours to precipitate magnesium-rich solids. At the end of this time the mixture contained 15% solids which were separated by vacuum filtration. The $N/P_2O_5$ ratio and the concentration of the filtrate was adjusted to give a 10–45–0 fertilizer solution by addition of 630 parts of water and 2,120 parts of superphosphoric acid, the same as that initially added. The final product contained 0.09% HgO and was stable for at least six months.

EXAMPLE IV

About 400 parts of ammoniated superphosphoric acid was prepared analyzing 11.05% N, 37.5% $P_2O_5$ and 0.53% MgO. This slightly acid solution is typical of commercially available ammonium polyphosphate solutions. The pH was 6.0 indicating that the superphosphoric acid was only partially neutralized. To 400 parts of this acidic ammonium polyphosphate solution was added 18 parts of ammonia and 44 parts of water at a reaction temperature of 85° C., at which temperature the reaction mixture was a clear solution. The solution was then cooled to 60° C. and held at that temperature for 24 hours. The resultant slurry contained about 25% solids. This slurry was filtered to give a filtrate containing 12.0% N, 30.5% $P_2O_5$ and 0.06%. The $N/P_2O_5$ ratio was 0.39. About 335 parts of this filtrate was placed in a one plate still and distilled at 60° to 105° C. at atmospheric pressure until the pH of the residue was about 6.2, indicating that most of the readily volatized ammonia had been removed. This residue contained 11.3% N and 36.1% $P_2O_5$. About 247 parts of the residue was adjusted to pH 6.1 by addition of 3 parts of orthophosphoric acid containing 61.5% $P_2O_5$, and the solution was diluted with 21 parts of water to give a final solution containing about 10.3% N, 33.5% $P_2O_5$, and 0.07% MgO. About 55.5% of the $P_2O_5$ in the product solution was in the form of polyphosphoric acids. After 6 months storage this product had not precipitated solids.

This example shows that the method of adjusting the final $N/P_2O_5$ ratio is not critical. From this and other examples it is seen that the final adjustment of the $N/P_2O_5$ ratio may be accomplished by vaporization of ammonia and/or addition of phosphoric acid either as superphosphoric acid or orthophosphoric acid. Also this adjustment may be carried out at any time after precipitation of magnesium-containing solids has been accomplished, i.e., either before or after separations of these solids from the solution. It may be said that the final adjustment of the $N/P_2O_5$ ratio is accomplished by conventional means.

The illustration of the method that constitutes the invention given above are not intended to limit the invention in any way but are merely descriptive of the method. All modifications which fall within the spirit of the present invention are claimed as part of the present invention.

We claim:
1. A process of producing stable ammonium polyphosphate solutions containing less than 0.1% MgO comprising:
   (a) mixing 30–40% aqueous ammonia with superphosphoric acid containing 68–73% $P_2O_5$ to give a reaction solution having a $N/P_2O_5$ ratio varying from 0.39–0.42 and a pH in the range of 8.5–8.8;
   (b) maintaining the temperature of the reaction at 85–100° C.;
   (c) cooling said reaction solution after mixing to a temperature range of 55–65° C.
   (d) maintaining the reaction solution at 55–65° C. for at least 12 hours until 5–25% solids are precipitated and magnesium oxide is thereby removed from the solution;
   (e) separating said precipitated solids;
   (f) evaporating part of the excess ammonia;
   (g) adding phosphoric acid to the reaction solution to adjust $N/P_2O_5$ ratio to within the range of 0.28–0.32; and
   (h) adding water to the reaction solution.

2. A process of producing ammonium polyphosphate solutions having a $Mg/P_2O_5$ ratio of about 0.0016 and less than 0.1% MgO from ordinary acidic ammonium polyphosphate solutions containing some unneutralized superphosphoric acid comprising:
   (a) adding 30–40% aqueous ammonia to the said polyphosphate solution to give a reaction solution having a $N/P_2O_5$ ratio varying from 0.39–0.42 and a pH in the range of 8.5–8.8;
   (b) maintaining the temperature of the reaction at 85–100° C.;
   (c) cooling said reaction solution after mixing to a temperature range of 55–65° C.;
   (d) maintaining the reaction solution at 55-65° C. for at least 12 hours until 5–25% solids are precipitated and magnesium oxide is thereby removed from the solution;
   (e) adding superphosphoric acid to the reaction solution to adjust the $N/P_2O_5$ ratio to within the range of 0.28–0.32;
   (f) separating said precipitated solids; and
   (g) adding water to the reaction solution.

References Cited
UNITED STATES PATENTS

| | | | |
|---|---|---|---|
| 2,917,380 | 12/1959 | Franklin | 71—34 |
| 3,044,851 | 7/1962 | Young | 23—107 |
| 3,141,732 | 7/1964 | McCullough et al. | 71—43 |
| 3,290,140 | 12/1966 | Young | 71—34 |
| 3,453,074 | 7/1969 | Mustian | 71—34 |

REUBEN FRIEDMAN, Primary Examiner

C. N. HART, Assistant Examiner

U.S. Cl. X.R.

23—107; 71—43